Patented Apr. 16, 1940

2,197,258

UNITED STATES PATENT OFFICE 2,197,258

PREPARATION OF ACROLEIN

Alexander Douglas Macallum, Niagara Falls, N. Y., assignor to E. I. du Pont de Nemours & Company, Wilmington, Del., a corporation of Delaware No Drawing. Application January 31, 1936, Serial No. 61,841

12 Claims. (Cl. 260—604)

This invention relates to the preparation of acrolein by the oxidation of propylene.

Although it has been known for a considerable time that acrolein could be prepared from propylene and aqueous acid mercuric sulphate at 85–100° (Deniges: Compt. rend. 126: 1145 (1898); Chem. Zent. 1898 (1): 1166), the method has remained without practical significance and the aldehyde is still made by the dehydration of glycerol. The reasons for this have been (1) that the yields of acrolein to be obtained by the procedure of Deniges have amounted to 34–35% at most, much of the propylene and mercuric sulphate used being wasted in the formation of by-products and (2) that the bulk of the solutions to be handled has been such as to preclude the use of the method on any practical scale.

These defects have been overcome in the following invention which has as an object the production of acrolein in comparatively high yield by the oxidation of propylene with mercuric sulfate. A further object of this invention is to effect the production of acrolein under such conditions as to obviate the need of handling bulky reaction mixtures such as entailed in the procedure of Deniges.

These objects are attained by the herein described invention which consists essentially in the reaction of propylene with aqueous solutions or suspensions of mercuric sulphate of substantially lower acidity than that employed by Deniges. By this improvement the acrolein yields based on the mercuric sulphate used can be greatly increased and the bulk of the mixtures needed cut down to practicable amounts at the same time.

I have studied the reaction of propylene with mercuric sulphate over a wide range of conditions, of temperature, pressure, concentration and acidity, and have found that a low acidity, rather than any other factor, is the most essential condition making for a good yield of acrolein from these materials. Thus by control of the acidity alone it has been possible to increase the yield of acrolein from as little as 4% to as much as 75% on basis of the mercuric sulphate used.

While a low acidity in the mercuric sulphate mixtures favors the production of acrolein from propylene, I have found that the use of acid cannot be eliminated altogether. Aqueous solutions or suspensions of neutral mercuric sulphate combine with propylene in approximately molecular proportions at about 70°, but such mixtures may be boiled without appreciable formation of aldehyde. To effect the improvement in procedure I employ a mercuric sulphate-water mixture, the acidity of which is equivalent to a concentration of not more than 15% by weight of sulfuric acid. This acidity is substantially less than that employed by Deniges, which was equivalent to a minimum concentration of 18–19% of sulfuric acid. I prefer to employ an acidity equivalent to 2% to 5% concentration of sulfuric acid, although I have obtained very good results using mixtures of still lower acidity, namely of about one half of one percent concentration of sulfuric acid.

The reaction may be effected in one operation, for example by passing propylene gas through refluxing acid mercuric sulphate solutions or suspensions, the acrolein formed being swept out with the effluent gas; or it may be carried out in stages as by one of the following procedures: The olefine may, for instance, be absorbed in warm neutral aqueous solutions or suspensions of mercuric sulphate, the acrolein then being expelled by acidifying and boiling the mixtures; or the olefine may be absorbed in weakly acid aqueous mercuric sulphate mixtures at moderate temperatures, such as 50–60°, then the unsaturated aldehyde expelled at a still higher temperature, e. g. by boiling. The reaction may be carried out with some success at superatmospheric pressures, for example at about 8–10 atmospheres pressure and temperatures around 100°, but I have found no particular advantage in this to offset the added inconvenience.

The concentration of mercuric sulfate in the reaction mixture may vary within wide limits. For example, I have obtained good yields from mixtures containing as low as 3% by weight of mercuric sulfate and as high as 24% of this salt. Still lower or higher concentrations may be used, if desired, e. g. around 50% by weight or higher. Since the amount of acrolein found is approximately stoichiometrically proportional to the amount of mercuric sulfate used, I prefer to use concentrations of not less than about 10% by weight of the salt, for example, around 25%. Higher concentrations may be used if desired, but if the concentration is so high that the suspension is a thick paste or slurry, the yield based on mercuric sulfate taken may be relatively lower, due to incomplete mixing of the reactants.

Any excess of propylene may be employed without materially affecting the course of the reaction or the recovery of acrolein with respect to the mercuric sulphate. The acrolein produced appears to be free from by-product propionaldehyde or acetone where the concentration and acidity of the aqueous reaction mixtures is lowest, but by the procedure I prefer, e. g. by working with fairly concentrated, weakly acid aqueous mercuric sulphate suspensions, the acrolein formed is free of formaldehyde but is accompanied by propionaldehyde or acetone in amounts equivalent to from 2% to 5% recoveries on the mercuric salt used. No volatile mercury compound appears to be formed in preparation of acrolein in this way but slight amounts of metallic mercury and sulphurous acid are produced along with the main by-product, mercurous sulphate.

The acrolein formed from propylene and aqueous acid mercuric sulphate may be separated from the effluent gases by cooling or by absorption in solvents such as water or tetrachloréthane, which tend to lower the partial pressure of the aldehyde. The separated aldehyde may then be recovered in a pure state by fractional distillation methods such as have been employed heretofore for the purification of this material.

*Example*

A suspension of 1.66 parts by weight of mercuric sulfate in 7 parts of water containing 0.125 part of sulfuric acid is stirred and heated to 50 to 60° C. Propylene gas then is slowly passed into the liquid suspension at such rate that absorption of the gas is practically complete (little or no gas leaving the liquid). When the reaction is complete, which requires about one hour, the absorption of the gas will cease. The propylene flow then is stopped and a slow stream of nitrogen is passed through the liquid. At the same time, the liquid is heated to a temperature of 110 to 115° C. under a reflux condenser with the still-head temperature maintained at about 60° C. During this refluxing operation, the acrolein vapor is expelled from the solution, together with unreacted propylene. The acrolein is separated from the off-gases by water scrubbing at a temperature of about 0° C. and pure acrolein is obtained from the aqueous solution by distillation.

The mercuric sulfate during the reaction with the propylene is reduced to mercurous sulfate. This may be recovered from the solution by evaporation and filtration and reoxidized to mercuric sulfate by one of several known means, as desired. A convenient method consists in heating in air at 200–235° C. for several hours, after adding 4 to 7 parts by weight of sulfuric acid. I prefer to oxidize the mercurous salt by adding to the substantially dry salt 1.6 to 2.3 parts of concentrated sulfuric acid containing about one tenth of its volume of concentrated nitric acid and heating the mixture to 220 to 225° C. for about 2 hours. Other suitable means of oxidizing the mercurous salt include (a) heating with nitric acid at 140–145° C. and (b) treating with chlorine gas at ordinary temperature, after moistening with sulfuric acid. The reoxidized mercury salt may be used to oxidize a fresh quantity of propylene to acrolein.

I claim:

1. The process for preparing acrolein which comprises reacting propylene with a mixture of mercuric sulfate and water which has an acidity equivalent to not more than 15% by weight of sulfuric acid.

2. The process for preparing acrolein which comprises reacting propylene with a mixture of mercuric sulfate and water which has an acidity equivalent to about 2 to 5% by weight of sulfuric acid.

3. The process for preparing acrolein which comprises reacting propylene with a mixture of mercuric sulfate, sulfuric acid and water which has an acidity equivalent to about 0.5 to 15% by weight of sulfuric acid and heating the reaction mixture to a temperature not lower than about 100° C. and not higher than about the boiling point of said reaction mixture.

4. The process for preparing acrolein which comprises reacting propylene with a mixture of mercuric sulfate and an aqueous solution of sulfuric acid in a concentration of about 2 to 5% by weight of said acid and heating the reaction mixture to a temperature not lower than about 100° C. and not higher than about the boiling point of said reaction mixture.

5. The process for preparing acrolein which comprises passing propylene into a mixture of mercuric sulfate and an aqueous sulfuric acid solution having an acidity equivalent to not more than 15% by weight of sulfuric acid, at about boiling temperature and recovering escaping vapors of acrolein by absorption in an acrolein solvent.

6. The process for preparing acrolein which comprises passing propylene into a mixture of mercuric sulfate and an aqueous sulfuric acid solution having an acidity equivalent to not more than 15% by weight of sulfuric acid, said mixture containing 3 to 50% by weight of mercuric sulfate, while maintaining said mixture at about boiling temperature and recovering escaping vapors of acrolein by absorption in an acrolein solvent.

7. The process for preparing acrolein which comprises passing propylene into a mixture of mercuric sulfate and an aqueous sulfuric acid solution having an acidity equivalent to not more than 15% by weight of sulfuric acid at a temperature of 50 to 60° C. and thereafter heating said mixture to a temperature in the neighborhood of its boiling point and recovering escaping vapors of acrolein by absorption in an acrolein solvent.

8. The process for preparing acrolein which comprises passing propylene into a mixture of mercuric sulfate and an aqueous sulfuric acid solution having an acidity equivalent to about 2 to 5% by weight of sulfuric acid, said mixture containing around 25% by weight of mercuric sulfate, while maintaining said mixture at a temperature of 50 to 60° C. and thereafter heating said mixture to a temperature in the neighborhood of its boiling point and recovering escaping vapors of acrolein by absorption in water at a temperature of around 0° C.

9. The process for preparing acrolein which comprises passing propylene into a mixture of mercuric sulfate and an aqueous sulfuric acid solution having an acidity equivalent to about 2 to 5% by weight of sulfuric acid said mixture containing around 25% by weight of mercuric sulfate, while maintaining said mixture at a temperature of 50 to 60° C. and thereafter heating said mixture to a temperature in the neighborhood of its boiling point and recovering escaping vapors of acrolein by absorption in tetrachlorethane.

10. The process for preparing acrolein which comprises passing propylene into a mixture of mercuric sulfate and an aqueous sulfuric acid solution having an acidity equivalent to not more than 15% by weight of sulfuric acid, while maintaining said mixture at about the boiling point of the reaction mixture and recovering escaping vapors of acrolein by absorption in an acrolein solvent.

11. The process for preparing acrolein which comprises passing propylene into a mixture of mercuric sulfate and an aqueous sulfuric acid solution having an acidity equivalent to about 2 to 5% by weight of sulfuric acid, said mixture containing around 25% by weight of mercuric sulfate, while maintaining said mixture at about the boiling point of the reaction mixture and recovering escaping vapors of acrolein by absorption in water at a temperature of around 0° C.

12. The process for preparing acrolein which comprises passing propylene into a mixture of mercuric sulfate and an aqueous sulfuric acid solution having an acidity equivalent to about 2 to 5% by weight of sulfuric acid, said mixture containing around 25% by weight of mercuric sulfate, while maintaining said mixture at about the boiling point of the reaction mixture and recovering escaping vapors of acrolein by absorption in tetrachlorethane.

ALEXANDER DOUGLAS MACALLUM.